Nov. 29, 1949    H. H. NEEDHAM    2,489,802
METHOD OF CONSTRUCTING MULTILAYER CYLINDERS
Filed April 2, 1945
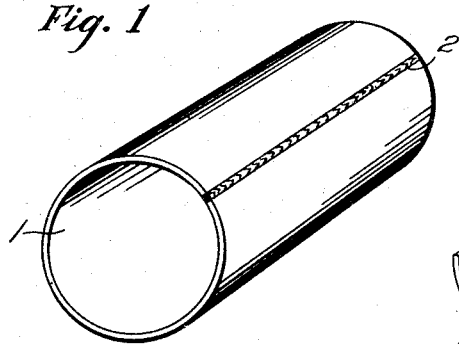
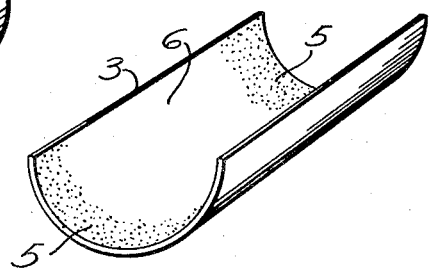
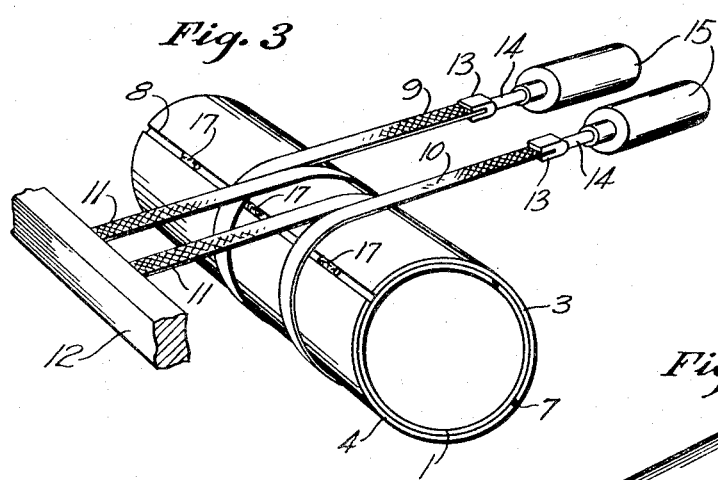
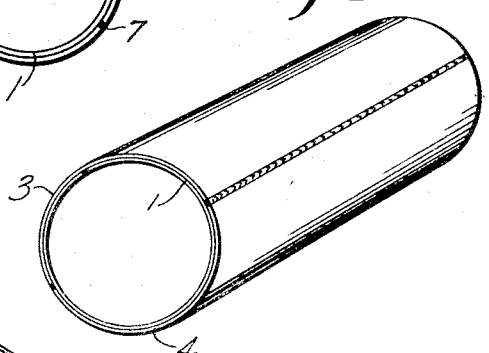
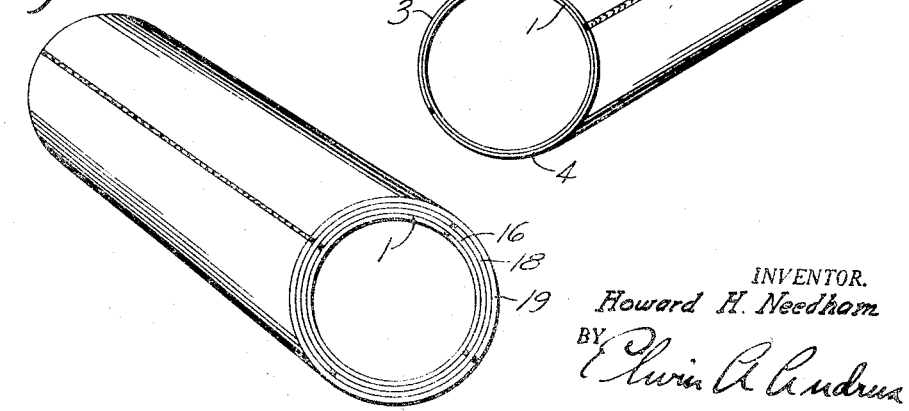
INVENTOR.
Howard H. Needham
BY
Elvin A. Andrus
Attorney Patented Nov. 29, 1949

2,489,802

UNITED STATES PATENT OFFICE 2,489,802

METHOD OF CONSTRUCTING MULTILAYER CYLINDERS

Howard H. Needham, Wauwatosa, Wis., assignor to A. O. Smith Corporation, Milwaukee, Wis., a corporation of New York Application April 2, 1945, Serial No. 586,071

3 Claims. (Cl. 29—148.2)

This invention relates to a method of constructing multi-layer cylinders.

The invention has been applied in the construction of penstock wherein the ratio of the diameter to the wall thickness is relatively high, usually well in excess of ten. In such cylinders there is little if any stress differential between the several layers and a pre-stressing of the walls for the purpose of more uniformly distributing the stress in service is unnecessary and in fact undesirable. However, it is desired that the several layers be made to conform to each other and that no air pockets exist therebetween.

One of the objects of the present invention is to provide a method of assuring conformity in shape between the layers without requiring a retention of excessive or undue pre-stresses in the metal thereof.

Another object is to facilitate the shaping of each layer upon the previous layer of the structure.

Another object is to remove the pre-stressing of the metal in the final structure as a factor in obtaining conformity in shape between the layers and vice versa.

In carrying out the invention a lubricant such as graphite is employed between a portion or all of the meeting surfaces of adjacent layers at the time of tightening the same together, thereby facilitating conformity of the layers to each other prior to a pre-stressing of the same. In actual practice the tightening should be sufficient to apply a substantial pre-stress, particularly where only a portion of the surfaces is lubricated, and thereafter the tightness may be released to a point where there is only a little, if any, pre-stress, and the structure is then welded.

The invention is illustrated in the accompanying drawings in which:

Figure 1 is a perspective view showing an inner cylinder;

Fig. 2 is a similar view showing a curved plate to be applied thereto;

Fig. 3 is a similar view showing a tightening and welding operation wherein two curved plates are tightened upon the inner cylinder by bands tensioned by hydraulic means;

Fig. 4 is a similar view showing the plates welded in place; and

Fig. 5 is a similar view showing a completed multi-layer section having four layers of metal.

In constructing a multi-layer cylinder the inner cylinder 1 is first formed from a metal plate and welded along the longitudinal seam 2, the surface of the weld being ground smooth and flush with the outer surface of the cylinder.

The second layer may be composed of two plates 3 and 4, each generally curved to semi-circular shape. Before applying the plates 3 and 4 to cylinder 1, a thin layer 5 of lubricant such as a graphite compound is spread over the inside surface of the plates or over the outer surface of cylinder 1, or both.

While it is possible to cover the entire surface of the plates with the lubricant 5, it is preferable to leave a substantial length uncovered. As shown in the drawing the lubricant is applied to a circumferential strip portion of the inner surface at each end of the respective plates, leaving a substantial central circumferential portion 6 without a coating of lubricant.

The plates 3 and 4, thus lubricated, are applied to cylinder 1 with their corresponding adjacent edges providing two longitudinal seams 7 and 8 for welding. Seam 7 is immediately tack welded at spaced intervals therealong to secure the plates in place.

The tightening bands 9 and 10 are then applied around the structure with their fixed ends 11 held by the fixed frame member 12, and their movable ends 13 held by the piston rods 14 of hydraulic cylinders 15. The bands are tightened upon the structure by operation of cylinders 15, thereby bringing the plates 3 and 4 into substantially absolute conformity of shape with cylinder 1. This tightening should substantially exceed that necessary for mere surface conformity so that all possible variations of conditions are eliminated as a factor.

In the tightening just described, the graphite lubricant will function to facilitate conformity of the plates with the cylinder in the regions of the lubricant, by enabling free slipping of the surfaces upon one another. The frictional resistance provided by the non-lubricated portion will be insufficient to prevent the final conformity desired.

At this stage of the tightening there will usually be a substantial compression of the metal of the inner cylinder 1, which, if the outer plates 3 and 4 were to be welded in the tightened position indicated, would reflect in a substantial tensioning of the second layer 16 as soon as the bands 9 and 10 were removed.

This residual stressing of the multi-layer pressure cylinder would be applicable to constructions wherein the diameter to wall thickness ratio is under about 10 and wherein a pre-stressing of the structure as indicated is highly desirable.

In such case the lubricant functions to reduce the forces necessary to obtain conformity and increase the component of the tightening of the bands applicable to the pre-stressing of the structure.

However, in the case of penstock structures wherein the diameter to wall thickness ratio is large, the pre-stressing of the structure is thought to be undesirable. In order to avoid pre-stressing and at the same time maintain the conformity obtained by the tightening step, the tensioning of the bands 9 and 10 upon the structure is slightly released prior to tack welding seam 8 as at 17. This release of the tension in bands 9 and 10 should be sufficient to assure substantial release of compression of inner cylinder 1 but insufficient to destroy the conformity of the layers.

The plates 3 and 4 having been shaped upon the cylinder 1 by the tightening operation will remain in conformity therewith when the tensioning of the bands is thus partially released, as described above. The non-lubricated region 6, having been tightened under friction, will tend to snub any reversal of movement of the layers and to cause them to retain their conformity to cylinder 1 although the latter is almost completely released from compression.

After the partial slackening of bands 9 and 10, the seam 8 is tack welded as at 17. The bands 9 and 10 are then removed and the seam 8 completely welded.

Additional layers 18 and 19 may be applied in the same manner, any suitable number of layers being applied.

In the completed multi-layer cylinder the several layers 1, 16, 18 and 19 will conform to each other, almost absolutely. In the case of a pressure vessel where pre-stress is of advantage the pre-stress is more readily provided by the invention by substantially removing the frictional engagement of the layers as a factor. In the case of a penstock or the like where pre-stress may be undesirable, it is avoided by the present invention by releasing the tightening forces prior to welding.

Various modes of carrying out the invention may be employed within the scope of the accompanying claims.

I claim:

1. In the manufacture of multi-layer cylinders in which individual layers of plate metal are successively applied, tightened and welded upon an inner cylindrical structure, applying a lubricant material between the successive layers in the end circumferential zones thereof while leaving the central circumferential zone free of lubricant and subject to frictional surface engagement between the layers whereby the tightening of the individual layers is facilitated during fabrication.

2. In the manufacture of multi-layer cylinders in which individual layers of plate metal are successively applied, tightened and welded upon an inner cylindrical structure, applying a lubricant material between the successive layers in the end circumferential zone while leaving the central circumferential zone free of lubricant and subject to frictional surface engagement between the layers, tightening each successive layer upon the partially completed structure under wrapping forces bringing the respective layer into conformity with said structure, and welding each successive layer while held in such conformity.

3. In the manufacture of multi-layer cylinders in which individual layers of plate metal are successively applied, tightened and welded upon an inner cylindrical structure, applying a lubricant material to the successive layers in the end circumferential zones thereof while leaving the central circumferential zones free of lubricant and subject to frictional surface engagement between the layers, tightening each successive layer upon the partially completed structure under wrapping forces bringing the respective layer into conformity with said structure, and substantially compressing the structure, partially releasing said tightening wrapping forces to substantially relieve said structure of compression while retaining the conformity referred to, and welding each successive layer while held in such conformity, said central zone of frictional engagement serving to snub the loosening of the respective layer upon the structure when said tightening forces are partially released.

HOWARD H. NEEDHAM.

REFERENCES CITED

The following references are of record in the file of this patent:

UNITED STATES PATENTS

| Number | Name | Date |
|---|---|---|
| 1,773,926 | Michael | Aug. 26, 1930 |
| 1,925,118 | Stresau | Sept. 5, 1933 |
| 2,217,090 | Zerbe | Oct. 8, 1940 |
| 2,270,185 | Dulmage | Jan. 13, 1942 |
| 2,324,547 | Wagner | July 20, 1943 |